(12) United States Patent
Cardin (10) Patent No.: US 11,067,548 B2
(45) Date of Patent: Jul. 20, 2021

(54) MULTI-CAPILLARY COLUMN PRE-CONCENTRATION SYSTEM FOR ENHANCED SENSITIVITY IN GAS CHROMATOGRAPHY (GC) AND GAS CHROMATOGRAPHY-MASS SPECTROMETRY (GCMS)

(71) Applicant: Entech Instruments Inc., Simi Valley, CA (US)

(72) Inventor: Daniel B. Cardin, Simi Valley, CA (US)

(73) Assignee: Entech Instruments Inc., Simi Valley, CA (US)

( * ) Notice: Subject to any disclaimer, the term of this patent is extended or adjusted under 35 U.S.C. 154(b) by 152 days.

(21) Appl. No.: 15/479,122

(22) Filed: Apr. 4, 2017

(65) Prior Publication Data

US 2017/0284978 A1    Oct. 5, 2017

Related U.S. Application Data

(60) Provisional application No. 62/318,061, filed on Apr. 4, 2016.

(51) Int. Cl.
*G01N 30/14* (2006.01)
*G01N 30/12* (2006.01)
(Continued)

(52) U.S. Cl.
CPC .............. *G01N 30/14* (2013.01); *B01L 3/502* (2013.01); *G01N 1/405* (2013.01); *G01N 1/44* (2013.01);
(Continued)

(58) Field of Classification Search
None
See application file for complete search history.

(56) References Cited

U.S. PATENT DOCUMENTS 4,180,389 A    12/1979 Paul
5,014,541 A    5/1991 Sides et al.
(Continued)

FOREIGN PATENT DOCUMENTS

CN    102393429 A    3/2012
CN    102302886 B    8/2013
(Continued)

OTHER PUBLICATIONS

Mclaughlin, L. G., et al. (Nov. 28, 1989). "Determination of dexamethasone in bovine tissues by coupled-column normal-phase high-performance liquid chromatography and capillary gas chromatography—mass spectrometry," Drug Testing and Toxicology, NYS College of Veterinary Medicine, Cornell University, 925 Warren Drive, Ithaca, NY 14850 U.S.A. located at: http://www.sciencedirect.com/science/article/pii/S0378434700838037?via%3Dihub, 19 pages.

(Continued)

*Primary Examiner* — Xiaoyun R Xu
(74) *Attorney, Agent, or Firm* — Kubota & Basol LLP (57) ABSTRACT

A multi-capillary column pre-concentration trap for use in various chromatography techniques (e.g., gas chromatography (GC) or gas chromatography-mass spectrometry (GCMS)) is disclosed. In some examples, the trap can include a plurality of capillary columns connected in series in order of increasing strength (i.e., increasing chemical affinity for one or more sample compounds). A sample can enter the trap, flowing from a sample vial to a relatively weak column to the relatively strongest column of the trap by way of any additional columns included in the trap, for example. In some examples, the trap can be heated and backflushed so that the sample exits the trap through the head of the relatively weak column. Next, the sample can be injected into a chemical analysis device for performing the (Continued)

chromatography technique (e.g., GC or GCMS) or it can be injected into a secondary multi-capillary column trap for further concentration.

21 Claims, 4 Drawing Sheets

(51) Int. Cl.

| | | |
|---|---|---|
| *B01L 3/00* | (2006.01) | |
| *G01N 1/40* | (2006.01) | |
| *G01N 1/44* | (2006.01) | |
| *G01N 30/30* | (2006.01) | |
| *G01N 30/46* | (2006.01) | |
| *G01N 30/72* | (2006.01) | |
| *G01N 30/60* | (2006.01) | |
| *G01N 30/40* | (2006.01) | |

(52) U.S. Cl.
CPC ............ *G01N 30/12* (2013.01); *G01N 30/30* (2013.01); *G01N 30/461* (2013.01); *G01N 30/7206* (2013.01); *B01L 2200/10* (2013.01); *B01L 2300/0627* (2013.01); *B01L 2300/0838* (2013.01); *B01L 2300/16* (2013.01); *B01L 2300/18* (2013.01); *G01N 30/40* (2013.01); *G01N 30/6078* (2013.01); *G01N 2030/121* (2013.01); *G01N 2030/128* (2013.01); *G01N 2030/143* (2013.01)

(56) References Cited

U.S. PATENT DOCUMENTS

| | | | |
|---|---|---|---|
| 5,135,549 A | 8/1992 | Phillips et al. | |
| 5,141,534 A | 8/1992 | Sacks et al. | |
| 5,191,211 A | 3/1993 | Gorman, Jr. | |
| 5,392,634 A | 2/1995 | Asano et al. | |
| 5,402,668 A | 4/1995 | Murakami et al. | |
| 5,449,902 A | 9/1995 | Onishi et al. | |
| 5,492,555 A | 2/1996 | Strunk et al. | |
| 5,547,497 A | 8/1996 | Klemp et al. | |
| 5,596,876 A | 1/1997 | Manura et al. | |
| 5,720,798 A | 2/1998 | Nickerson et al. | |
| 5,929,321 A | 7/1999 | Bertrand | |
| 6,614,228 B2 | 9/2003 | Hofmann et al. | |
| 6,632,268 B2 | 10/2003 | Seeley | |
| 6,989,129 B2 | 1/2006 | Licklider et al. | |
| 7,451,634 B2 | 11/2008 | Gamache et al. | |
| 7,642,089 B2 | 1/2010 | Pieper et al. | |
| 7,647,812 B2 | 1/2010 | Arnold et al. | |
| 7,823,439 B2 | 11/2010 | Fisher | |
| 8,143,071 B2 | 3/2012 | Gjerde | |
| 8,613,215 B2 | 12/2013 | Lambertus et al. | |
| 8,621,912 B2 | 1/2014 | Guieze | |
| 9,188,568 B2 | 11/2015 | Ebeler et al. | |
| 9,228,984 B2 | 1/2016 | Lu et al. | |
| 9,240,311 B2 | 1/2016 | Whitehouse et al. | |
| 9,627,188 B2 | 4/2017 | Ariya et al. | |
| 2001/0027722 A1 | 10/2001 | Bremer et al. | |
| 2005/0124076 A1 | 6/2005 | Tseng et al. | |
| 2006/0245975 A1 | 11/2006 | Tipler et al. | |
| 2007/0071638 A1 | 3/2007 | Kraiczek et al. | |
| 2008/0264491 A1 | 10/2008 | Klee et al. | |
| 2008/0289397 A1 | 11/2008 | Hassan et al. | |
| 2009/0238722 A1 | 9/2009 | Mora-Fillat et al. | |
| 2010/0022764 A1 | 1/2010 | Otoshi et al. | |
| 2010/0242579 A1 | 9/2010 | Tipler et al. | |
| 2014/0299547 A1 | 10/2014 | Muller-Spath et al. | |
| 2015/0233876 A1 | 8/2015 | Dellea et al. | |
| 2016/0332141 A1 | 11/2016 | Machida et al. | |

FOREIGN PATENT DOCUMENTS

| | | |
|---|---|---|
| CN | 108387668 A | 8/2018 |
| EP | 0 597 602 A1 | 5/1994 |
| EP | 0806661 A1 | 11/1997 |
| EP | 2757369 A1 | 7/2014 |
| JP | H-11248694 A | 9/1999 |
| JP | 2017-173281 A | 9/2017 |

OTHER PUBLICATIONS

Packham, A. J. et al. (Oct. 1989). "Complex Sample Analysis by Cybernetic Multi-dimensional Chromatography," Analytical Proceedings, vol. 26, Department of Instrumentation and Analytical Science, UMIST, Manchester, M60 1QD, located at: http://pubs.rsc.org/-/content/articlelanding/1989/ap/ap9892600336#idivAbstract, 17 pages.

International Search Report dated Jul. 4, 2017, for PCT Patent Application No. PCT/US2017/025993, filed Apr. 4, 2017, six pages.

GL Science. (Date Unknown). "Multipurpose Sampling Thermal Desorption System MSTD258," GL Science, located at: URL: https://www.glsciences.com/c-product/sample/sa-instruments/multipurpose-sampling-thermal-desorption-system-mstd258/, 4 pages.

Materic, D. et al. (Dec. 2015). "Methods in Plant Foliar Volatile Organic Compounds Research," ResearchGate 2018, 25 pages.

Agilent (Date Unknown). "Capillary PoraPLOT Q", Agilent, located at: https://www.agilent.com/en/products/gas-chromatography/gc-columns/capillary/poraplot-q 5 pages.

Aguilar, C. et al. (Apr. 1999). "Equilibrium-Sorptive Enrichment: A Novel Technique for Trace Analysis in Air", J. High Resol. Chromatogr., 4 pages.

Andrews, S. J. et al. (Apr. 23, 2015). "Technical Note: A fully automated purge and trap GC-MS system for quantification of volatile organic compound (VOC) fluxes between the ocean and atmosphere", Ocean Sci., 9 pages.

Broadway, G. et al. (Date Unknown). "WHITE PAPER Gas Chromatography", PerkinElmer, Inc., 13 pages.

Choe, K. et al. (2013). "A Study on Trapping CO2 Using Molecular Sieve for 14C AMS Sample Preparation", Radiocarbon, 5 pages.

Gowlowski, J. et al. (Oct. 25, 2000). "Dry purge for the removal of water from the solid sorbents used to sample volatile organic compounds from the atmospheric air", Analyst, 6 pages.

Harper, M. (2000). "Sorbent trapping of volatile organic compounds from air", Journal of Chromatography A, 885, 23 pages.

International Search Report dated Feb. 12, 2019, for PCT Patent Application No. PCT/US2018/057151, filed Oct. 23, 2018, five pages.

International Search Report dated Feb. 12, 2019, for PCT Patent Application No. PCT/US2018/058349, filed Oct. 31, 2018, five pages.

Tang, Y. et al. (Jul. 15, 1993). "Determination of C1-C4 Hydrocarbons in Air", Anal. Chem. 1993, 4 pages.

Wang, J. et al. (Sep. 8, 1999). "Automated gas chromatography with cryogenic/sorbent trap for the measurement of volatile organic compounds in the atmosphere", Journal of Chromatography A, 11 pages.

Braun, J. et al. (Jul. 14, 1975). "Studies of Polystyrene in the Region of the Glass Transition Temperature by Inverse Gas Chromatography", Studies of Polystyrene by Inverse Gas Chromatography, seven pages.

McClenny, W. A. et al. (1995). "Analysis of VOCs in Ambient Air Using Multisorbent Packings for VOC Accumulation and Sample Drying", Journal of the Air & Waste Association, ten pages.

Estek (Mar. 2011)."Plot Columns Instruction Sheet", RESTEK Chromatography Products, two pages.

Sacks, R. et al. (1994). "High-Speed GC Analysis of VOCs: Tunable Selectivity and Column Selection", Environ. Sci. Technol., six pages.

MULTI-CAPILLARY COLUMN PRE-CONCENTRATION SYSTEM FOR ENHANCED SENSITIVITY IN GAS CHROMATOGRAPHY (GC) AND GAS CHROMATOGRAPHY-MASS SPECTROMETRY (GCMS)

CROSS-REFERENCE TO RELATED APPLICATIONS

This application claims the benefit of U.S. Provisional Patent Application No. 62/318,061, filed on Apr. 4, 2016, the entire disclosure of which is incorporated herein by reference in its entirety for all intended purposes.

FIELD OF THE DISCLOSURE

This relates to traps for pre-concentrating a sample for use in various chromatography techniques such as gas chromatography (GC) and/or gas chromatography-mass spectrometry (GCMS).

BACKGROUND OF THE DISCLOSURE

GC and GCMS are techniques of performing analysis of trace chemicals in a wide range of sample matrices. In some examples, these techniques can be used to study biological matrices such as breath, blood, and urine; to study trace chemicals in food, water, soil and air; to measure chemical emissions from synthetics and rubbers; for forensic analysis of accelerants and drug residues; to detect odors in foods, beverages, products, and water supplies; and/or to analyze pharmaceuticals dissolved in water.

In some examples, gas phase samples for GC and/or GCMS can be pre-concentrated to increase the sensitivity for trace level analysis and to decrease bulk constituents such as air, $CO_2$, and water vapor before GC or GCMS is performed on the samples. Such pre-concentration can be performed using packed column traps. However, such packed column traps can have high carryover of previously preconcentrated chemicals from run to run and can cause poor repeatability of GC and/or GCMS measurements of samples. Thus, there exists a need for improved traps for pre-concentrating samples before GC and/or GCMS analysis.

SUMMARY OF THE DISCLOSURE

This relates to traps for pre-concentrating a sample for use in various chromatography techniques such as gas chromatography (GC) and/or gas chromatography-mass spectrometry (GCMS). In some examples, a trap can comprise a plurality of capillary columns for adsorbing one or more compounds included in a sample. The capillary columns can be arranged in series in order of increasing strength (e.g., increasing affinity for one or more compounds included in the sample) in the direction at which the sample enters the trap, for example; that is, the sample can flow from the weakest column to the strongest column. In some examples, bulk gases (e.g., air, excess carrier gas, water vapor, etc.) can exit the trap, thereby concentrating the sample held within. The concentrated sample can be desorbed from the trap by heating the capillary columns and backflushing the sample in a flow direction opposite of the flow direction at which the sample entered the trap, that is, from the strongest column to the weakest column, for example.

In some examples, the backflushed sample can be directly injected into a chemical analysis device, such as a gas chromatograph for performing GC or GCMS, or some other chemical analysis device for performing some other analysis process. In some examples, the backflushed sample can be injected into a secondary capillary column trap similar to the first capillary column trap (i.e., a primary trap) for increased concentration. The secondary capillary column trap can include one or more capillary columns, and these capillary columns can also be arranged in series in order of relative column strength, for example. In some examples, the sample can be backflushed from the secondary capillary column trap into the chemical analysis device. The chemical analysis device can include a detector, including, for example, a non-specific detector such as FID, PID, EDC, PDD, ELCD, or PDD or a spectrometry-based detector such as IR, UV, and VUV. In some examples, other detector types are possible.

DETAILED DESCRIPTION

In the following description, reference is made to the accompanying drawings which form a part hereof, and in which it is shown by way of illustration specific examples that can be practiced. It is to be understood that other examples can be used and structural changes can be made without departing from the scope of the examples of the disclosure.

This relates to traps for pre-concentrating a sample for use in various chromatography techniques such as gas chromatography (GC) and/or gas chromatography-mass spectrometry (GCMS). In some examples, a trap can comprise a plurality of capillary columns for adsorbing one or more compounds included in a sample. The capillary columns can be arranged in series in order of increasing strength (e.g., increasing affinity for one or more compounds included in the sample) in the direction at which the sample enters the trap, for example; that is, the sample can flow from the weakest column to the strongest column. In some examples, bulk gases (e.g., air, excess carrier gas, water vapor, etc.) can exit the trap, thereby concentrating the sample held within. The concentrated sample can be desorbed from the trap by heating the capillary columns and backflushing the sample in a flow direction opposite of the flow direction at which the sample entered the trap, that is, from the strongest column to the weakest column, for example.

In some examples, the backflushed sample can be directly injected into a chemical analysis device, such as a gas chromatograph for performing GC or GCMS, or some other chemical analysis device for performing some other analysis process. In some examples, the backflushed sample can be injected into a secondary capillary column trap similar to the first capillary column trap (i.e., a primary trap) for increased concentration. The secondary capillary column trap can include one or more capillary columns, and these capillary columns can also be arranged in series in order of relative column strength, for example. In some examples, the sample can be backflushed from the secondary capillary column trap into the chemical analysis device.

Figure 1:
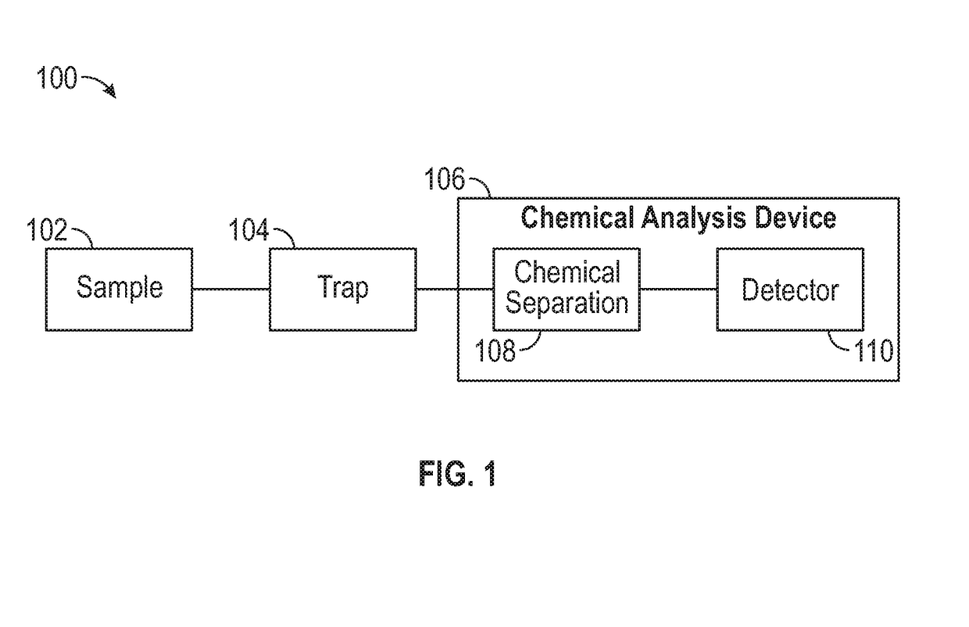
FIG. 1 illustrates an exemplary gas chromatography (GC) configuration according to examples of the disclosure.

FIG. 1 illustrates an exemplary gas chromatography (GC) configuration 100 according to examples of the disclosure. Configuration 100 can be used to determine one or more compounds in a sample using gas chromatography (GC) or gas chromatography-mass spectrometry (GCMS), and can include sample 102, trap 104 and chemical analysis device 106, which can include chemical separation device 108 and detector 110, all of which will now be described.

Sample 102 can correspond to the sample of interest on which GC or GCMS is going to be performed. Sample 102 can be a gas phase sample, and can be collected by any appropriate means such as in one or more Tedlar bags or in one or more vacuum sampling stainless steel canisters as described in EPA Method TO15. Specifically, sample 102 can be a collection of chemicals in outdoor or indoor air, in process streams, in stack gas, landfill gas, bio-waste gas, breath samples, or in the headspace above liquid or solid samples. Headspace measurements could include the analysis of blood, urine, drinking and waste water, soils, consumer products, wood, plastics, composites, etc. Configuration 100 could additionally be used in the analysis of aromas, odors, and taints in foods and beverages (wine, beer, soft drinks).

Sample 102 can flow into trap 104 for pre-concentration before being injected into chemical analysis device 106. In some examples, a carrier gas (e.g., an inert gas such as Helium or an unreactive gas such as Nitrogen) can flow sample 102 through trap 104 to preconcentrate sample 102. In some examples, the gas phase sample 102 itself can be drawn into trap 104 for preconcentration. Trap 104 can be any suitable means for concentrating sample 102 for rapid delivery into chemical analysis device 106 for analysis. Exemplary details for trap 104 will be described with reference to FIGS. 2A-2B and 3A-3B.

Chemical analysis device 106 can perform chemical analysis on sample 102 after having been concentrated in trap 104 to, for example, determine the composition of sample 102. In some examples, chemical analysis device 106 can be a device that performs GC and/or GCMS on sample 102 to determine the composition of sample 102. For example, chemical analysis device can include chemical separation device 108, through which concentrated sample 102 can pass, and which can separate compounds within sample 102 based on their properties (e.g., mass, volatility, chemical affinity, etc.). In some examples, chemical separation device 108 can be one or more capillary columns that can include one or more adsorbents, and through which concentrated sample 102 can pass. Finally, after separation in chemical separation device 108, the compounds within sample 102 can exit chemical separation device 108 and be detected by detector 110. Detector 110 can be any suitable detector for detecting the presence and/or identities of compounds exiting chemical separation device 108. For example, detector 110 can be a mass spectrometer (e.g., in a GCMS configuration). The detector can be, for example, a non-specific detector such as FID, PID, EDC, PDD, ELCD, or PDD or a spectrometry-based detector such as IR, UV, and VUV. In some examples, other detector types are possible. Different compounds within sample 102 can exit chemical separation device 108 at different times depending on one or more properties of the compounds (e.g., mass, volatility, chemical affinity, etc.) and one or more properties of chemical separation device 108 (e.g., capillary column inner diameter, the adsorbent in the capillary columns, etc.).

In some cases, a gas chromatograph is not necessary, and the trap 104 can transfer pre-concentrated sample directly to a relevant detector when the resolving power of the detector is sufficient for measurement and/or detection without gas chromatography separation.

Thus, configuration 100 can be used to perform chemical analysis on sample 102 (e.g., GC or GCMS) to determine the composition of sample 102.

In some examples, trap 104 can be composed of one or more packed columns through which sample 102 can pass for pre-concentration before being injected into chemical analysis device 106. Packed columns can be tubes of a given material (e.g., stainless steel) filled with adsorbent particles for facilitating adsorption of sample 102 as it passes through the packed columns. As the gas phase sample 102 passes through the one or more packed columns each containing one or more adsorbents, compounds within sample 102 can adsorb to the adsorbent particles within the packed columns while excess gas can exit the one or more packed columns, thus concentrating sample 102. The adsorbed compounds can then be injected into chemical analysis device 106 for analysis.

However, packed columns can have various deficiencies relating to pre-concentrating sample 102 before injection into chemical analysis device 106. One deficiency is channeling, whereby flow rate of sample 102 (e.g., including the bulk gas and/or carrier gas containing sample 102 compounds) through the packed columns can exceed the diffusion rate between the sample 102 compounds and the adsorbent particles in the packed columns. When packed columns are heated during conditioning or thermal desorption the adsorbent can expand, and when the packed columns are cooled down to trap the next sample, the adsorbent can contract resulting in "channels" forming through the adsorbent and a separation of the adsorbent from the walls of the tubing, for example. These "channels" can create one or more low impedance flow paths that can allow the air or bulk gas in the sample to direct the sample compounds "further" into the trap than may have occurred without formation of flow channeling gaps. During thermal desorption, the adsorbent can again expand and these gaps can be closed off, reducing the opportunity for easy recovery of the chemicals directed further into the trap. In turn, these unrecovered chemicals can increase contamination and carryover, as the sample may not be completely removed during thermal desorption and reconditioning. With each thermal cycling, the exact nature of these channels or gaps can change, which can result in inconsistent penetration, recovery, and therefore inconsistent analytical reproducibility. Allowing the sample to penetrate further into the packed column trap can also invite greater degrees of thermal decomposition, as the chemicals can spend longer on a hot packed trap with potentially high surface activity. Channeling can cause the sample to have varying degrees of penetration/adsorption into the packed columns both on a run to run and a trap to trap basis. That is, the degree of penetration of sample 102 into the packed columns and/or the amount of sample 102 that is adsorbed by the packed columns can vary from one concentration run to the next, despite run parameters remaining constant. Similarly, the degree of penetration of sample 102 into the packed columns and/or the amount of sample 102 that is adsorbed by the packed columns can vary from one packed column to the next, despite the parameters of the packed columns remaining constant. Such variance in penetration and adsorption can cause non-repeatable or poorly repeatable chemical analysis results for a given sample that is being analyzed. Additionally or alternatively, in some examples, packed column traps can suffer from poor water management. Even when the packed adsorbent particles are hydrophobic, due to the relatively large size of the adsorbent particles, water can be retained inside of the adsorbent particles due to the longer times needed to diffuse the water molecules out of the larger adsorbent particles. In some examples, the total amount of retained water molecules can depend on the concentration of water in the original sample 102, creating a "relative humidity" dependency on water removal efficiency. Retained water can cause substantial interferences both with gas chromatography and detection by many detectors such as mass spectrometry. Water can also hydrolyze GC columns at elevated temperatures, which can cause reduced GC column lifetimes and increased frequency of detector cleaning due to the heavier "bleed" from the GC column.

An additional or alternative deficiency of packed columns can relate to competing design considerations for the sizes of adsorbent particles used in the packed columns. As previously mentioned, a packed column can be filled with adsorbent particles. However, a gas phase sample must be able to flow through the packed columns at a flow rate sufficient to allow the sample to be concentrated in the packed columns. Therefore, to prevent excessive pressure drop along the lengths of the packed columns, the adsorbent particles used must be relatively large (e.g., so that the gas phase sample or the carrier gas-sample combination can flow relatively freely through the packed columns). However, large adsorbent particles can retain adsorbed chemicals or compounds longer than small adsorbent particles (e.g., because these chemicals or compounds can diffuse to a greater depth in large adsorbent particles than in small adsorbent particles)—this increased retention can make the process of desorbing those chemicals from the packed columns (e.g., for injection into chemical analysis device 106) more difficult or time consuming, which can cause poor run to run reproducibility. Further, in some examples, this increased retention can make removing the chemicals from the packed columns for cleaning purposes more difficult, especially when the samples being concentrated in the packed columns are of relatively high concentration or have relatively high molecular weight compounds (e.g., compounds with a high affinity for the adsorbent particles which may be difficult to desorb). Inconsistent cleanup of the packed columns can, in turn, cause contamination of subsequent preconcentration runs and chemical analyses (e.g., of the same or different samples), which can introduce noise or unpredictability in subsequent chemical analysis processes and can make quantitative measurements difficult or impossible, especially when performing trace level analysis. As such, an improved trap 104 for use in GC or GCMS can be beneficial.

Figure 2A:
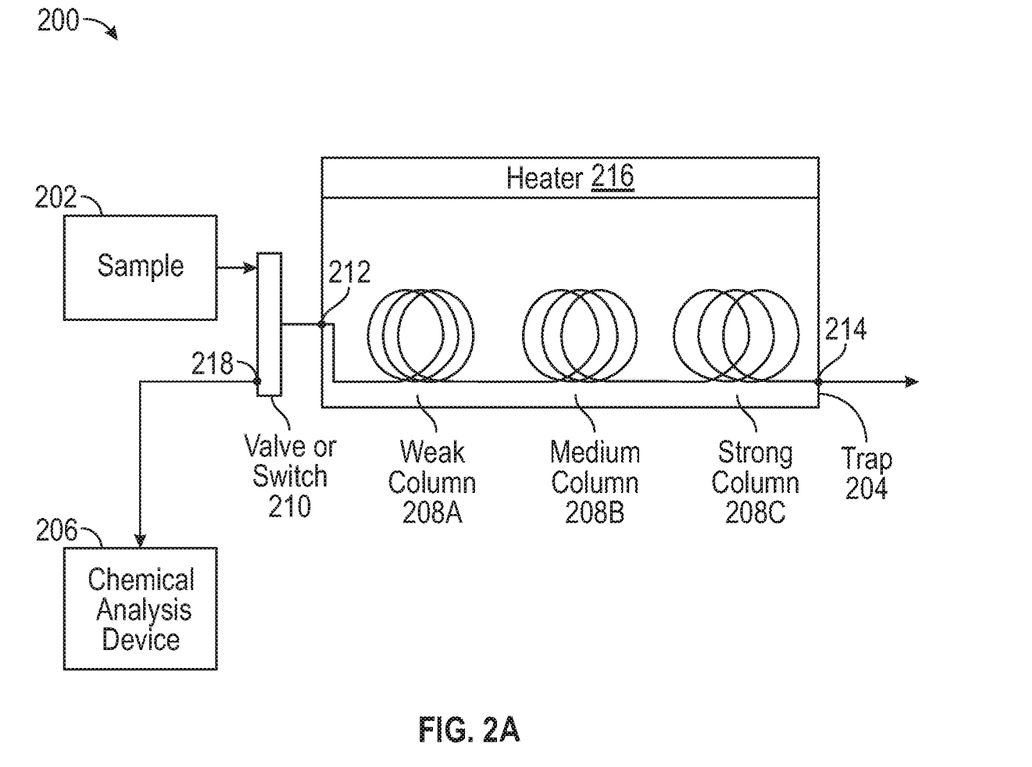
FIGS. 2A-2B illustrate an exemplary multi-capillary column trap configuration and associated method according to examples of the disclosure.
Figure 2B:
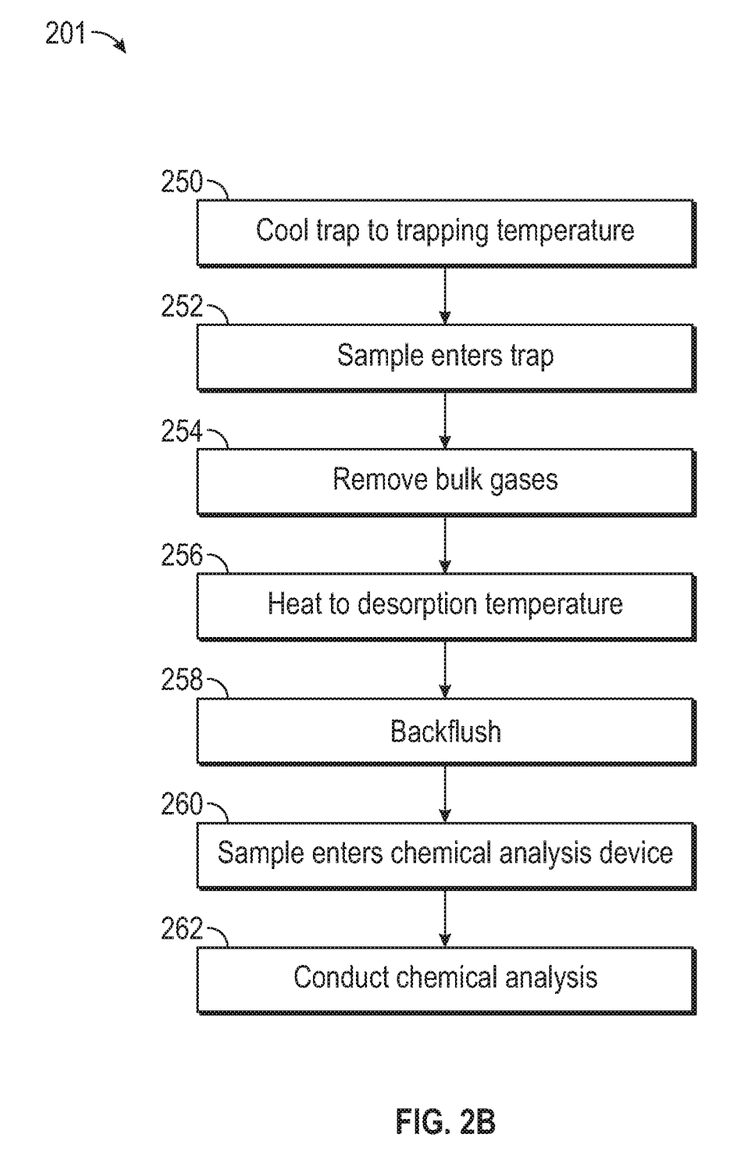

FIGS. 2A-2B illustrate an exemplary multi-capillary column trap configuration 200 and associated method according to examples of the disclosure. In FIG. 2A, sample 202 can correspond to sample 102 in FIG. 1, trap 204 can correspond to trap 104 in FIG. 1, and chemical analysis device 206 can correspond to chemical analysis device 106 in FIG. 1. Sample 202 can flow, with a carrier gas, into trap 204 via valve or switch 210. Valve or switch 210 can be configurable to allow for a gas (e.g., the gas phase sample or carrier gas-sample combination) to flow into trap 204 from sample 202 at port 212 or backflushed out of trap 204 at port 212 into chemical analysis device 206.

Trap 204 can include two or more capillary columns 208 coupled together in series, as illustrated, through which gas phase sample can flow when flowing through trap 204. In some examples, these two or more capillary columns 208 can sequentially increase in strength, such that the first capillary column through which the carrier gas-sample combination can flow can have a first strength, the second capillary column through which the carrier gas-sample combination can flow can have a second strength, greater than the first strength, the third capillary column (if any) through which the carrier gas-sample combination can flow can have a third strength, greater than the first and second strengths, and so on. A capillary column can be an "open tubular" structure (e.g., a tube) for use in GC and/or GCMS that has adsorbent (e.g., small adsorbent particles or a thin film polymer) coating its internal walls rather than having adsorbent particles packed throughout the column diameter, such as in a packed column. As such, the center of a capillary column can remain open; thus, predictable, repeatable, non-obstructed open flow of the gas phase sample through the center of the capillary column is achieved. The strength of a capillary column can correspond to its affinity to, or tendency to adsorb, one or more compounds within sample 202. For example, a low strength capillary column can have relatively low affinity to, or tendency to adsorb or absorb, one or more compounds within sample 202, and a high strength capillary column can have relatively high affinity to, or tendency to adsorb, one or more compounds within sample 202. The strength of a capillary column can be a function of one or more of its physical characteristics (e.g., its length, its inner diameter, the adsorbent coated on its inner walls, etc.). For example, in FIG. 2A, trap 204 can include three capillary columns coupled in series: relatively weak column 208A, relatively moderate-strength column 208B and relatively strong column 208C, though it is understood that fewer or more columns of sequentially increasing strength can be used in the examples of the disclosure. As the volume of sample 202 that needs to be analyzed is increased and/or as the boiling point range of the compounds that are being analyzed is increased, the more columns can be used in trap 204.

Each of columns 208 can vary from 0.01 meters in length to several (e.g., two, three or five) meters in length. In some examples, weak column 208A can be a 0.53 mm ID 100% polydimethylsiloxane column, moderate column 208B can be a 0.53 mm ID Porous Layer Open Tubular (PLOT) Q column (e.g., 0.5 to 2 meters in length), and strong column 208C can be a 0.53 mm ID carbon molecular sieve PLOT column (e.g., 0.1 to 2 meters in length). These column details are provided by way of example only, and it is understood that additional or alternative columns can be used in accordance with the examples of the disclosure. For example, column 208C (e.g., the strongest column in trap 204) can be a very strong PLOT column such as a carbon molecular sieve, which can allow for the recovery of very low boiling compounds without needing cryogenic or electronic cooling of trap 204. In general, one or more of columns 208 can be Porous Layer or Polymer Layer Open Tubular columns, which can produce good consistency and high sample throughput due to relatively short bakeout times (e.g., during cleaning), relatively low blank levels, relatively good water management (e.g., separation of water from the concentrated sample) and relatively good sample recovery from trap 204 (e.g., during desorption for sample analysis). Columns 208 within trap 204 can be coupled together using GC column unions, such as glass press fit unions or any low volume connection.

Trap 204 can also include heater 216, which can be any suitable means for heating (or otherwise controlling the temperature of) the capillary columns 208 within trap 204. For example, capillary columns 208 can be contained within an oven or a mandrill (e.g., aluminum or copper) to allow for consistent temperatures of the columns 208 whether trapping compounds (e.g., at a cool temperature, such as 20-50° C.) or back desorbing compounds (e.g., at a hot temperature, such as 100-300° C.) during cleaning or for sample analysis. In some examples, heating may be performed by passing an electrical current through a resistive coating or sleeve on the columns or by wrapping heating wire around the columns. In some examples, heater 216 can include an external fan or blower than can reduce the temperature of the oven (and thus trap 204 and/or columns 208) to ambient temperatures (e.g., 25° C.) or lower.

A brief description of the operation of trap 204 will now be provided, with further details provided with reference to FIG. 2B. A gas phase sample or carrier gas-sample combination can flow from sample 202, through valve 210, into port 212, through weak column 208A, through moderate column 208B, through strong column 208C and out of exit port 214. As the carrier gas-sample combination flows through columns 208 of increasing strength, various compounds within the sample can adsorb to different ones of columns 208 while the remainder of the carrier gas-sample combination flows out of trap 204, thus concentrating sample 202 within trap 204. In some examples, multiple columns of increasing strength can allow compounds to be subjected to only as much adsorbent strength as is necessary to retain it, which in turn limits the maximum temperature needed for recovery of the compounds. Limiting the maximum temperature needed to recover the compounds can improve recovery and limit the extent of thermal degradation that would decrease both reproducibility and column life, for example. In some examples, a separate gas containing an internal standard may also be introduced to allow better quantitation by the chemical analysis device 206. After sample 202 has been concentrated within columns 208, heater 216 can heat columns 208, and columns 208 can be backflushed with another carrier gas flowing in through exit port 214, through columns 208C, 208B and 208A (e.g., to desorb the concentrated sample 202), out of port 212 and valve 210, through desorption port 218, and into chemical analysis device 206 for chemical analysis as described above. Optionally, the sample can be cryofocused after exiting column 208A before injection into the chemical analysis device 206. Pneumatic (or other suitable) control strategies can be used to control the operation of trap 204 within configuration 200. For example, valve or switch 210 can comprise rotary valves or Deans switches for changing the direction of gas flow through columns 208, and one or more mass flow controllers (e.g., at port 212, desorption port 218 and/or exit port 214) can be used to measure the volume of sample passing through columns 208. In some examples, valve or switch 210, port 212, desorption port 218, and/or exit port 214 can control flow rate and measure the volume of the sample. A computer system including one or more processors and non-transitory memory can control the various components of configuration 200 to control the operation of the components (e.g., gas flow rate, temperature, etc.) to produce consistent chemical recoveries and precise measurements.

By using capillary columns 208 in trap 204 for pre-concentration of sample 202 (e.g., instead of the packed columns described previously), one or more of the deficiencies of packed column pre-concentration can be avoided. In particular, capillary columns 208 can have relatively small inner diameters (e.g., 0.021" or less). This small inner diameter can allow diffusion of compounds or chemicals (e.g., included in gas phase sample or the carrier gas-sample combination) within the columns to be fast enough to ensure complete or near complete interaction of the compounds or chemicals with the adsorbent or absorbent on the inner walls of the capillary columns, leading to consistent and repeatable adsorption of sample from run to run. Further, the open "non-packed" centers of the capillary columns 208 can reduce gas flow resistance and improve gas flow regularity (e.g., from run to run or column to column) as compared with packed columns. Further, the relative geometry of the coating thickness and the diameter of the "unpacked" opening can remain nearly the same whether trapping at cool temperatures or thermally desorbing at high temperatures, which can eliminate the dramatic variations seen in packed trap geometry where channels can form while the packed trap is cool and can then completely disappear when the trap is heated, creating substantial inconsistencies. By using two or more capillary columns connected in series with increasing strength (e.g., increasing adsorbent strength), and then backflushing the trapped compounds from the columns 208, a much wider range of compounds can be recovered than with packed column traps, including those boiling down to −100° C. to those up to and over +500° C. Capillary columns 208 used for pre-concentration in trap 204 also reduce memory effects (e.g., carryover from one run to the next, in that cleaning of the trap 204 of the compounds can be performed faster and more efficiently), because of the smaller adsorbent particle size that is used as compared with packed columns, and the reduction of inconsistent gas flow through the columns due to channeling, thus allowing lower system blank levels (e.g., baseline chemical levels) and more certainty when analyzing trace level compounds. For the same reasons, using capillary columns 208 in trap 204 can also provide for far more consistent adsorption of sample 202 from one trap to the next, thus improving the repeatability of measurements from one testing environment to the next. Further, in some examples, the relatively small size of the adsorbent particles can improve water management (e.g., removal of water from the concentrated sample) of the multi-capillary column trap, because the smaller adsorbent particles may allow water to diffuse out faster and more completely then with larger particles with much greater internal surface area.

FIG. 2B illustrates an exemplary method 201 for pre-concentration of a sample in trap 204 according to examples of the disclosure. Steps 250-262 are provided as exemplary only, and it is understood that one or more of steps 250-262 are optional, and additional or alternative steps may be implemented.

At 250, columns 208 can be cooled to a trapping temperature (e.g., 20-50° C.). In some examples, cooling the columns 208 to a trapping temperature can increase the chemical affinity between one or more compounds of sample 202 and the adsorbent of the columns 208. Cooling to subambient temperatures either electronically or using a cryogenic fluid may also be performed when it is desired to trap even lower boiling compounds or to shorten the lengths of the columns, for example.

At 252, sample (e.g., sample 202) can flow through the multi-capillary column trap of the disclosure (e.g., from port 212 to exit port 214 of trap 204). The amount of sample flowing through the columns (e.g., columns 208) of the trap 204 can be anywhere from 1-5000 cc. In some examples, a carrier gas-sample combination can flow through the trap 204 of the disclosure. The air, nitrogen or other very light compounds within the sample may not be trapped by the trap 204, and may flow through all of the columns and out (e.g., via exit port 214) to one or more flow controllers and/or volume measurement devices. In some examples, water vapor included in sample 202 may not be trapped by the trap 204, thus further concentrating the trapped sample. Other gases may also be added to the traps for purposes of GC or GCMS calibration, such as multi-calibration standards, external standards, or internal standards, for example.

At 254, the trap (e.g., trap 204) can be flushed with a gas (e.g., helium or hydrogen) to remove the remainder of the bulk gas from the sample remaining in the columns of the trap (e.g., the trap can be flushed from port 212 to exit port 214 with helium or hydrogen or any other appropriate gas for flushing the trap of unwanted bulk gas, such as air). This step can also remove undesirable water vapor from the trap.

At 256, the trap (e.g., columns 208 in trap 204) can be heated to a desorption temperature (e.g., 100-300° C.). In some examples, the temperature of the last column in the trap (e.g., column 208C) can be heated to the desorption temperature sooner than the earlier columns (e.g., by placing the last column closer to the heater underneath a mandrel in a mandrel-heater implementation) such that the compounds trapped by the last column can be back-desorbed sooner than the compounds trapped by the earlier columns, which can compress the sample into a smaller plug during the desorption process (in combination with step 258). In some examples, heating the trap 204 to an elevated desorption temperature can decrease the chemical affinity between one or more compounds of sample 202 and the adsorbent particles of the columns 208.

At 258, the trap can be backflushed (e.g., from exit port 214 to port 212 of trap 204 and out desorption port 218) with an appropriate gas (e.g., an inert or unreactive gas such as Helium, Hydrogen, or Nitrogen) during or after the trap is heated to the desorption temperature (or while the last column is heated to the desorption temperature and the earlier columns are still heating to the desorption temperature) to desorb the sample contained in the trap.

At 260, the backflushed compounds from step 258 can enter the chemical analysis device (e.g., chemical analysis device 206) via desorption port 218. In some examples, a section of tubing between the desorption port 218 and the chemical analysis device can be included in the configuration of FIG. 2A, and can be cool enough to cause undesirable water vapor to condense out of the sample, but not too cold to cause the loss of compounds of interest from the sample.

At 262, chemical analysis can be performed on the backflushed compounds from the trap (e.g., GC or GCMS). In this way, a multi-capillary column trap can be used to pre-concentrate a sample before chemical analysis is performed on that sample.

In some examples, arrangement 200 can further include a cryofocusing trap (not shown) between the head of column 208A and chemical analysis device 206. Cryofocusing can further concentrate the sample 202 by reducing its volume before chemical analysis occurs. However, when cryogenic focusing cannot be implemented due to safety, economic, or other concerns, in some examples, it can be advantageous to include a secondary trap between trap 204 and chemical analysis device 206, as will be described below.

Figure 3A:
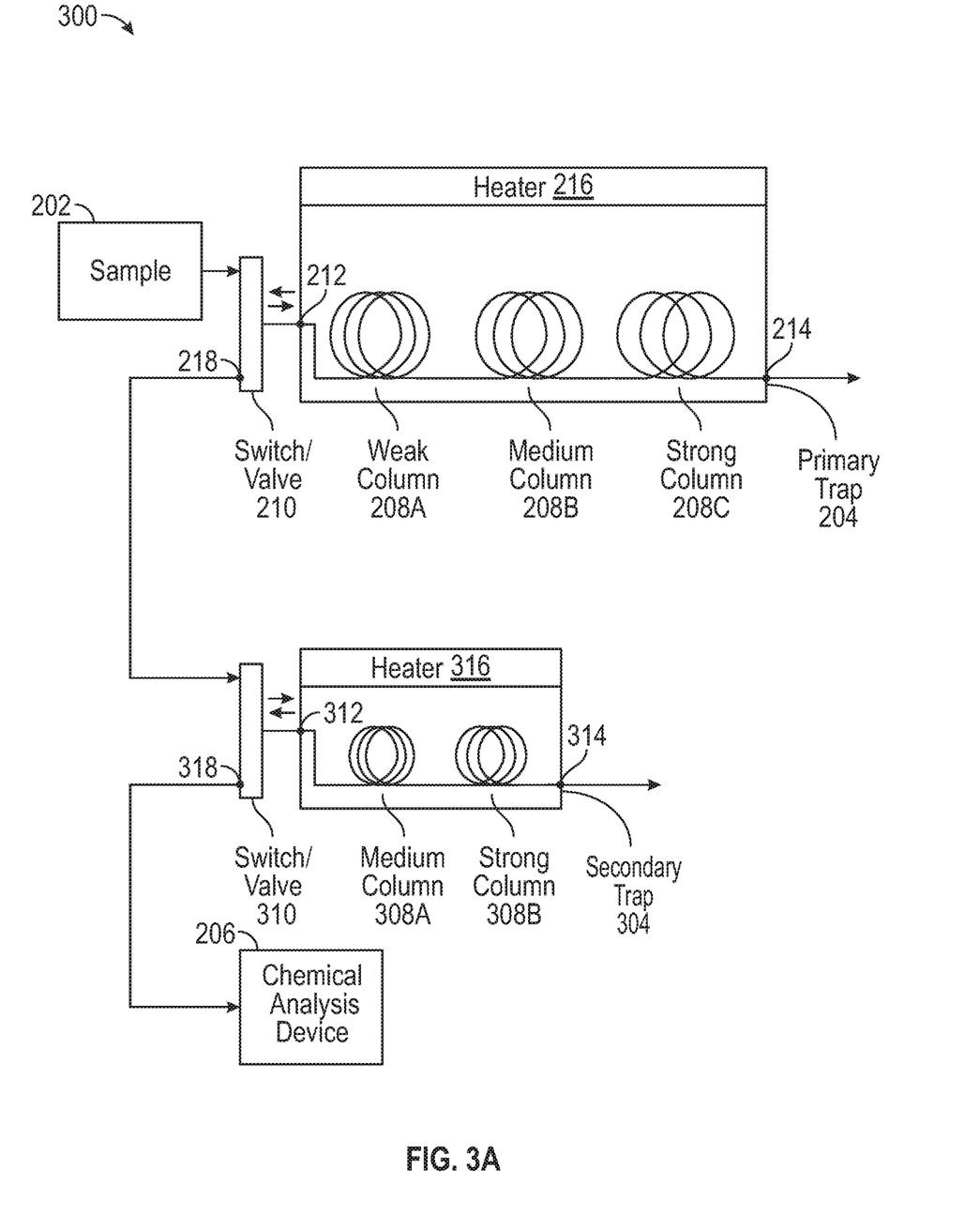
FIGS. 3A-3B illustrate another exemplary multi-capillary column trap configuration and associated method according to examples of the disclosure.
Figure 3B:
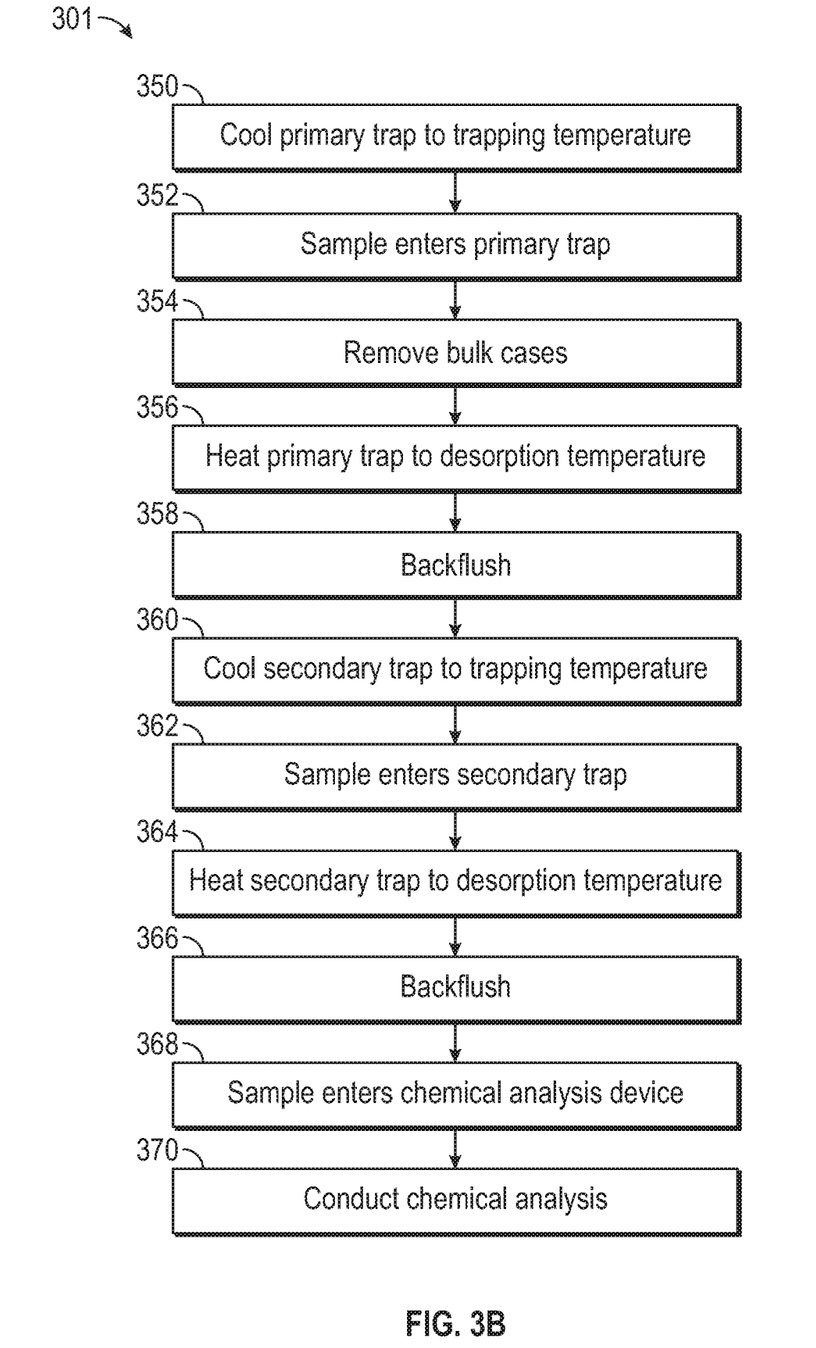

FIGS. 3A-3B illustrate another exemplary multi-capillary column trap configuration 300 and associated method according to examples of the disclosure. In some examples, a second capillary column trap may be used, downstream of a first capillary column trap (e.g., corresponding to trap 204 in FIG. 2A), to further concentrate a sample before chemical analysis is performed on the sample. For example, if a relatively large boiling point range of compounds is to be analyzed, or if the sample volume is relatively large, to increase sensitivity, the capillary columns used in the first trap may need to be relatively long. However, a first trap 204 with relatively long columns 208 may cause the compounds trapped in the first trap to be relatively spread out, which may inhibit rapid injection of those compounds into a chemical analysis device 206. In such scenarios, a second capillary column trap 304 can be used to further concentrate the sample into a smaller volume before injection into the chemical analysis device. For example, if the first trap 204 collects 10-1000 cc of sample 202, that sample can be desorbed completely with 2-10 cc of helium and hydrogen. That 2-10 cc sample 202 can then be condensed into an even smaller volume by a second capillary column trap 304 for much faster injection into the chemical analysis device 206 using 0.1 to 0.5 cc of helium or hydrogen, for example. In some examples, trap 204 can be a primary trap 204 including primary columns 208 and secondary trap 304 can include secondary columns 308.

For example, in FIG. 3A, configuration 300 can be the same as configuration 200 in FIG. 2A, except as otherwise noted here. In particular, rather than sample from trap 204 being backflushed directly into chemical analysis device 206 as in FIG. 2A, sample from trap 204 can be backflushed into another trap 304 for further concentration before being injected into chemical analysis device 206. In the circumstances described above, such additional concentration of the sample can provide a narrow bandwidth and improved resolving power of the chemical analysis that is performed (e.g., improved resolving power of the GC or GCMS column(s) in the chemical analysis device).

Accordingly, valve 210 can be configured to allow backflushing of trap 204 into trap 304 via valve 310 through desorption port 218. Valve 310, similar to valve 210, can be configurable to allow for a gas (e.g., the backflushed sample from trap 204) to flow into trap 304 from trap 204 at port 312 or out of trap 304 at port 312 via desorption port 318 into chemical analysis device 206 (e.g., to provide the backflushed sample from trap 304 to chemical analysis device 206). In some examples, valve 210 and valve 310 can be part of a single multi-port rotary valve.

Trap 304 can include one or more secondary capillary columns 308 coupled in series, which can be analogous to primary columns 208 and can operate similarly, and heater 316, which can be analogous to heater 216 and can operate similarly. In the case of more than one secondary column 308, the secondary columns can be sequentially arranged in increasing strength, similar to as described with reference to trap 204. For example, in FIG. 3A, trap 304 includes two secondary columns connected in series: weak/moderate column 308A and moderate/strong column 308B. In some examples, the number of columns 308 in trap 304 can be less than the number of columns in trap 204, as fewer columns may be needed in trap 304 due to the previous significant reduction of the volume of the sample in trap 204 (e.g., fewer columns may be needed to adsorb and concentrate the output from trap 204 than was originally needed to adsorb and concentrate the output from sample 202). Any details of trap 204 or configuration 200 provided in FIGS. 2A-2B can apply to trap 304 or configuration 300 described here, except as otherwise noted here.

A brief description of the operation of traps 204 and 304 will now be provided, with further details provided with reference to FIG. 3B. A gas phase sample 202 or a carrier gas-sample combination can flow from sample 202, through valve 210, into port 212, through weak column 208A, through moderate column 208B, through strong column 208C and out of exit port 214. As the gas phase sample 202 or the carrier gas-sample combination flows through primary columns 208 of increasing strength, various compounds within the sample can adsorb to different ones of primary columns 208 while the remainder of the bulk gas (e.g., air, nitrogen, carbon dioxide, methane, helium, hydrogen, etc.) or carrier gas-sample combination flows out of trap 204, thus concentrating sample 202 within trap 204. After sample 202 has been concentrated within primary columns 208, heater 216 can heat primary columns 208, and primary columns 208 can be backflushed with another carrier gas flowing in through exit port 214, through columns 208C, 208B and 208A (e.g., to desorb the concentrated sample 202), out of port 212 and valve 210, through desorption port 218, and into trap 304. In particular, the backflushed sample from trap 204 can flow from valve 210, through desorption port 218, into valve 310, into port 312, through weak/moderate column 308A, through moderate/strong column 308B and out of exit port 314. As the backflushed sample from trap 204 flows through secondary columns 308 of increasing strength, various compounds within the sample can adsorb to different ones of secondary columns 308 while the remainder of the sample combination flows out of trap 304, thus further concentrating the sample within trap 304. In some examples, the secondary columns 308 of trap 304 can be shorter than the primary columns 208 of trap 204 and the volume transferred from trap 204 to trap 304 can be smaller than the original sample volume. Accordingly, trap 304 can further concentrate the sample because there can be less carrier gas in the shortened secondary columns 308, compared to the carrier gas in the relatively longer primary columns 208, yet the mass of the sample 202 can remain the same. In this way, the sample 202 can be enriched relative to the carrier gas and can be injected faster into the chemical analysis device 206. After the sample has been further concentrated within secondary columns 308, heater 316 can heat columns 308, and secondary columns 308 can be backflushed with another carrier gas flowing in through exit port 314, through columns 308B and 308A (e.g., to desorb the further concentrated), out of port 312 and valve 310, through desorption port 318, and into chemical analysis device 206 for chemical analysis as described above. Pneumatic (or other suitable) control strategies can be used to control the operation of traps 204 and 304 within configuration 300. For example, valves or switches 210 and 310 can comprise rotary valves or Deans switches for changing the direction of gas flow through columns 208 and 308, and one or more mass flow controllers (e.g., at ports 212 and 312, desorption ports 218 and 318, and/or exit ports 214 and 314) can be used to measure the volume of sample passing through columns 208 and 308. A computer system including one or more processors and non-transitory memory can control the various components of configuration 300 to control the operation of the components (e.g., gas flow rate, temperature, etc.) to produce consistent chemical recoveries and precise measurements.

By using additional trap 304 for further concentration of sample 202, rapid injection of the sample into chemical analysis device 206 can be further facilitated.

FIG. 3B illustrates an exemplary method 301 for pre-concentration of a sample in traps 204 and 304 according to examples of the disclosure. Steps 350-370 are provided as exemplary only, and it is understood that one or more of steps 350-370 are optional, and additional or alternative steps may be implemented. Further, any details of method 201 provided in FIG. 2B can apply to method 301 described here, except as otherwise noted here.

Steps 350-358 can correspond to steps 250-258. For example, at 250, primary columns 208 in the primary trap 204 can be cooled to a trapping temperature (e.g., 20-50° C.). In some examples, cooling the primary columns 208 to a trapping temperature can increase the chemical affinity between one or more compounds of sample 202 and the adsorbent of the columns 208. Cooling to subambient temperatures either electronically or using a cryogenic fluid may also be performed when it is desired to trap even lower boiling compounds or to shorten the lengths of the columns, for example.

At 352, sample (e.g., sample 202) can flow through the primary multi-capillary column trap 204 of the disclosure (e.g., from port 212 to exit port 214 of trap 204). The amount of sample flowing through the columns (e.g., primary columns 208) of the primary trap 204 can be anywhere from 1-5000 cc. In some examples, a carrier gas-sample combination can flow through the primary trap of the disclosure. The air, nitrogen or other very light compounds within the sample may not be trapped by the primary trap, and may flow through all of the columns and out (e.g., via exit port 214) to one or more flow controllers and/or volume measurement devices. In some examples, water vapor included in sample 202 may not be trapped by the trap 204, thus further concentrating the trapped sample.

At 354, the primary trap (e.g., trap 204) can be flushed with a gas (e.g., helium or hydrogen) to remove the remainder of the bulk gas from the sample 202 remaining in the primary columns 208 of the trap 204 (e.g., the trap can be flushed from port 212 to exit port 214 with helium or hydrogen or any other appropriate gas for flushing the trap of unwanted bulk gas, such as air). This step can also remove undesirable water vapor from the trap.

At 356, the primary trap (e.g., primary columns 208 in trap 204) can be heated to a desorption temperature (e.g., 100-300° C.). In some examples, the temperature of the last column in the trap (e.g., column 208C) can be heated to the desorption temperature sooner than the earlier columns (e.g., by placing the last column closer to the heater underneath a mandrel in a mandrel-heater implementation) such that the compounds trapped by the last column can be back-desorbed sooner than the compounds trapped by the earlier columns, which can compress the sample into a smaller plug during the desorption process (in combination with step 358). In some examples, heating the trap 204 to an elevated desorption temperature can decrease the chemical affinity between one or more compounds of sample 202 and the adsorbent particles of the primary columns 208.

At 358, the primary trap can be backflushed (e.g., from exit port 214 to port 212 of trap 204 and out desorption port 218) with an appropriate gas (e.g., an inert or unreactive gas such as Helium or Nitrogen) while the trap is heated to the desorption temperature (or while the last column is heated to the desorption temperature and the earlier columns are still heating to the desorption temperature) to desorb the sample contained in the trap.

At 360, secondary columns 308 in the secondary trap 304 can be cooled to a trapping temperature (e.g., 20-50° C.) with heater 316. In some examples, cooling the secondary trap 304 to a trapping temperature can increase the chemical affinity of the sorbent in columns 308 and one or more compounds of sample 202. Cooling the secondary trap 304 can prepare the secondary trap to trap the sample 202. Cooling to subambient temperatures either electronically or using a cryogenic fluid may also be performed when it is desired to trap even lower boiling compounds, or to reduce the number of columns or lengths of columns needed for a specific range of compounds, for example. In some examples, step 360 can be performed before steps 356 and 358.

At 362, the backflushed compounds from step 358 can enter the secondary trap 304 from desorption port 218 and can flow through secondary columns 308 in the secondary trap 304. The air, nitrogen or other very light compounds within the sample may not be trapped by the secondary trap, and may flow through all of the columns and out (e.g., via exit port 314) to one or more flow controllers and/or volume measurement devices. In some examples, a section of tubing connected to desorption port 218 between the primary trap 204 and the secondary trap 304 can be included in the configuration of FIG. 3A, and can be cool enough to cause undesirable water vapor to condense out of the sample, but not too cold to cause the loss of compounds of interest from the sample.

At 364, the secondary trap (e.g., columns 308 in trap 304) can be heated to a desorption temperature (e.g., 100-300° C.). In some examples, the temperature of the last column in the secondary trap (e.g., column 308B) can be heated to the desorption temperature sooner than the earlier columns (e.g., by placing the last column closer to the heater underneath a mandrel in a mandrel-heater implementation) such that the compounds trapped by the last column can be back-desorbed sooner than the compounds trapped by the earlier columns, which can further compress the sample into a smaller plug during the desorption process (in combination with step 366). In some examples, heating the trap 304 to an elevated desorption temperature can decrease the chemical affinity between one or more compounds of sample 302 and the adsorbent particles of the secondary columns 308.

At 366, the secondary trap can be backflushed (e.g., from exit port 314 to port 312 of trap 304 and out desorption port 318) with an appropriate gas (e.g., an inert or unreactive gas such as Helium or Nitrogen) while the trap 304 is heated to the desorption temperature (or while the last column is heated to the desorption temperature and the earlier columns are still heating to the desorption temperature) to desorb the sample contained in the trap.

At 368, the backflushed compounds from step 366 can exit the secondary trap 304 from desorption port 318 and enter the chemical analysis device (e.g., chemical analysis device 206). In some examples, a section of tubing connected to desorption port 318 between the secondary trap 304 and the chemical analysis device 206 can be included in the configuration of FIG. 3A, and can be cool enough to cause undesirable water vapor to condense out of the sample, but not too cold to cause the loss of compounds of interest from the sample.

At 370, chemical analysis can be performed on the backflushed compounds from the secondary trap (e.g., GC or GCMS). In this way, multiple capillary column traps can be used to pre-concentrate a sample before chemical analysis is performed on that sample.

In some examples, any of the systems described above with reference to FIGS. 1-3 can include one or more processors (e.g., controllers, microprocessors, computers, computer systems, etc.) running software housed on a non-transitory computer-readable medium for performing, initiating, controlling, or assisting in any of the steps in any of the processes or methods described above with reference to FIGS. 1-3. In some examples, each software process can be executed on a different processor in a computing cluster or mainframe. Alternatively or in addition, some examples may implement one or more processors and/or computer-controlled processes as hardware, firmware, software, or a combination thereof.

As such, the examples of the disclosure provide improved trap device configurations for pre-concentrating a sample before chemical analysis is performed on the sample.

Therefore, according to the above, some examples of the disclosure are related to a first trap for pre-concentrating a sample before chemical analysis, the first trap comprising: a first primary capillary column having a first strength; a second primary capillary column having a second strength, greater than the first strength, the second primary capillary column coupled to the first primary capillary column in series, and one or more valves configured to: during an adsorption process, allow the sample to flow through the first primary capillary column and the second primary capillary column in a first direction, the first direction being from the first primary capillary column to the second primary capillary column, and during a desorption process, allow a desorption gas to flow through the first primary capillary column and the second primary capillary column in a second direction, the second direction being from the second primary capillary column to the first primary capillary column. Additionally or alternatively, in some examples the first trap further comprises a first adsorbent material within the first primary capillary column and a second adsorbent material within the second primary capillary column, the first and second adsorbent materials for adsorbing the sample, wherein: the first and second primary capillary columns are open-tubular capillary columns, the first adsorbent material coats an interior surface of the first primary capillary column, leaving a first open passageway through the first capillary column, and the second adsorbent material coats an interior surface of the second primary capillary column, leaving a second open passageway through the second capillary column. Additionally or alternatively, in some examples, the first strength is a first chemical affinity for one or more compounds of the sample, and the second strength is a second chemical affinity for the one or more compounds of the sample, the second affinity higher than the first affinity. Additionally or alternatively, in some examples during the adsorption process, the first trap has an adsorption temperature, and during the desorption process, the heater heats the first trap to a desorption temperature greater than the adsorption temperature. Additionally or alternatively, in some examples the heater is positioned a first distance from the first primary capillary column and a second distance less than the first distance from the second primary capillary column, the second primary capillary column reaches the desorption temperature before the first primary capillary column reaches the desorption temperature, and the desorption gas begins flowing from the second primary capillary column to the first primary capillary column while the second primary capillary column is at the desorption temperature but before the first primary capillary column reaches the desorption temperature. Additionally or alternatively, in some examples the first trap further comprises a desorption port between the first primary capillary column and a chemical analysis device, wherein: the desorption process causes the sample to desorb from the first and second primary capillary columns, during the desorption process, the one or more valves allow the desorbed sample to flow from the first primary capillary column to the chemical analysis device through the desorption port, and the chemical analysis device performs the chemical analysis on the desorbed sample. Additionally or alternatively, in some examples, the first trap further comprises an exit port coupled to an exit port end of the second primary capillary column, wherein the first primary capillary column is coupled to an end of the second primary capillary column that is opposite the exit port end of the second primary capillary column, wherein: during the adsorption process, one or more fixed gases exit the first and second primary capillary columns through the exit port, and during the desorption process, the desorption gas enters the second primary capillary column through the exit port. Additionally or alternatively, in some examples the one or more fixed gases comprise one or more of water vapor, air, carbon dioxide, methane, helium, hydrogen, and a carrier gas. Additionally or alternatively, in some examples, the first trap further comprises a first desorption port between the first primary capillary column and a second trap wherein: the desorption process causes the sample to back-desorb from the first and second primary capillary columns, during the desorption process, the one or more valves allow the desorbed sample to flow from the first primary capillary column to the second trap through the first desorption port, and the second trap comprises: a secondary capillary column having a first end switchably couplable to the first desorption port, and one or more second valves configured to: during a second adsorption process, allow the desorbed sample to flow through the secondary capillary column in a third direction, the third direction being from the first end of the secondary capillary column to an opposite end of the secondary capillary column, and during a second desorption process, allow a second desorption gas to flow through the secondary capillary column in a fourth direction, the fourth direction being from the opposite end of secondary capillary column to the first end of the secondary capillary column. Additionally or alternatively, in some examples the second trap includes fewer capillary columns than the first trap. Additionally or alternatively, in some examples the secondary capillary column of the second trap is shorter than the first and second primary capillary columns of the first trap. Additionally or alternatively, in some examples the second trap further comprises a second desorption port switchably couplable to the first end of the secondary capillary column, the second desorption process causes the sample to desorb from the secondary capillary column, during the second desorption process, the one or more second valves allow the desorbed sample from the secondary capillary column to flow from the secondary capillary column to the chemical analysis device through the second desorption port, and the chemical analysis device performs the chemical analysis on the desorbed sample from the secondary capillary column.

Some examples of the disclosure are related to method of pre-concentrating a sample before chemical analysis, the method comprising: during an adsorption process: allowing, via one or more valves, the sample to flow through a first primary capillary column of a first trap and a second primary capillary column of the first trap in a first direction, the first direction being from the first primary capillary column to the second primary capillary column; and during a desorption process: allowing, via the plurality of valves, a desorption gas to flow through the first primary capillary column and the second primary capillary column in a second direction, the second direction being from the second primary capillary column to the first primary capillary column, wherein: the first primary capillary column has a first strength, the second primary capillary column has a second strength greater than the first strength, and the first primary capillary column and the second primary capillary column are coupled in series. Additionally or alternatively, in some examples, the method further comprises during the desorption process, heating the first trap to a desorption temperature with a heater of the first trap, wherein: during the adsorption process, the first trap has an adsorption temperature, and the desorption temperature is greater than the adsorption temperature. Additionally or alternatively, in some examples the method further comprises during the desorption process: causing the sample to desorb from the first and second primary capillary columns; and allowing, via the one or more valves, the desorbed sample to flow from the first primary capillary column to a chemical analysis device through a desorption port between the first primary capillary column and the chemical analysis device; and performing the chemical analysis on the desorbed sample with the chemical analysis device. Additionally or alternatively, in some examples, the method further comprises during the adsorption process, allowing, via the one or more valves, one or more fixed gasses to exit the first and second primary capillary columns through an exit port of the first trap; and during the desorption process, allowing, via the one or more valves, the desorption gas to enter the primary capillary column through the exit port of the first trap, wherein: the exit port of the first trap is coupled to an exit port end of the second primary capillary column, and the first primary capillary column is coupled to an end of the second primary capillary column that is opposite the exit port end of the second primary capillary column. Additionally or alternatively, in some examples the desorption process causes the sample to back-desorb from the first and second primary capillary columns, and during the desorption process, the one or more valves allow the desorbed sample to flow from the first primary capillary column to a second trap through a first desorption port of the first trap, the method further comprising: during a second adsorption process, allowing, via one or more second valves of the second trap, the desorbed sample to flow through a secondary capillary column of the second trap in a third direction, the third direction being from a first end of the secondary capillary column to an opposite end of the secondary capillary column, and during a second desorption process, allowing, via the one or more second valves, a second desorption gas to flow through the secondary capillary column in a fourth direction, the fourth direction being from the opposite end of secondary capillary column to the first end of the secondary capillary column. Additionally or alternatively, in some examples the method further comprises during the second desorption process: desorbing the sample from the secondary capillary column; and allowing, via the one or more second valves, the desorbed sample from the secondary capillary column to flow from the secondary capillary column into a chemical analysis device through a second desorption port of the second trap; and performing, with the chemical analysis device, the chemical analysis on the desorbed sample from the secondary capillary column.

Some examples of the disclosure are directed to a system comprising: a sample container containing a sample; a first trap, the first trap comprising: a first primary capillary column having a first strength; a second primary capillary column having a second strength, greater than the first strength, the second primary capillary column coupled to the first primary capillary column in series; a chemical analysis device, the chemical analysis device comprising a detector configured to detect one or more compounds of the sample; and one or more valves fluidly coupling the first trap to the sample container, the one or more valves configured to: during an adsorption process, allow the sample to flow from the sample container through the first primary capillary column and the second primary capillary column in a first direction, the first direction being from the first primary capillary column to the second primary capillary column, and during a desorption process, allow a desorption gas to flow through the first primary capillary column and the second primary capillary column in a second direction, the second direction being from the second primary capillary column to the first primary capillary column and towards the chemical analysis device. Additionally or alternatively, in some examples the first trap further comprises a desorption port between the first primary capillary column and the chemical analysis device, wherein: the desorption process causes the sample to desorb from the first and second primary capillary columns, during the desorption process, the one or more valves allow the desorbed sample to flow from the first primary capillary column to the chemical analysis device through the desorption port, and the chemical analysis device performs the chemical analysis on the desorbed sample. Additionally or alternatively, in some examples, the system further comprises a second trap fluidly coupled to a desorption port of the first trap and to the chemical analysis device by way of the one or more valves, the second trap comprising a secondary capillary column, wherein: the desorption process is a first desorption process, and the one or more valves are further configured to: during the first desorption process, allow the sample to back-desorb from the first and second primary capillary columns and flow from the first primary capillary column to the second trap through the desorption port of the first trap; during a second adsorption process, allow the desorbed sample from the first trap to flow through the secondary capillary column in a third direction, the third direction being from a first end of the secondary capillary column to an opposite end of the secondary capillary column; and during a second desorption process, allow a second desorption gas to flow through the secondary capillary column in a fourth direction, the fourth direction being from the opposite end of the secondary capillary column to the first end of the secondary capillary column and into the chemical analysis device through a second desorption port of the second trap.

Although examples have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A first trap for pre-concentrating a sample before chemical analysis, the first trap comprising a first primary capillary column, a second primary capillary column, and a third primary capillary column connected in series with increasing affinity, wherein:
the first primary capillary column has an interior surface coated by a first sorbent, the first primary capillary column having a length between 0.2 and 5 meters, the first primary capillary column with the first sorbent having a first affinity for one or more compounds of the sample, wherein the first primary capillary column having the interior surface coated by the first sorbent is configured to adsorb one or more compounds while the first primary capillary column has a temperature between 20 and 50 degrees Celsius;
the second primary capillary column has an interior surface coated by a second sorbent, the second sorbent having a higher affinity for the one or more compounds than an affinity the first sorbent has for the one or more compounds, the second primary capillary column having a length between 0.2 and 5 meters, the second primary capillary column with the second sorbent having a second affinity for the one or more compounds of the sample, the second affinity greater than the first affinity, wherein the second primary capillary column having the interior surface coated by the second sorbent is configured to adsorb one or more compounds while the second primary capillary column has a temperature between 20 and 50 degrees Celsius;
the third primary capillary column has an interior surface coated by a third sorbent, the third sorbent having a higher affinity for the one or more compounds than the affinity the second sorbent has for the one or more compounds, the third primary capillary column having a length between 0.2 and 5 meters, the third primary capillary column with the third sorbent having a third affinity for the one or more compounds of the sample, the third affinity greater than the second affinity, wherein the second primary capillary column is coupled between the first primary capillary column and the third primary capillary column in series, wherein the third primary capillary column having the interior surface coated by the third sorbent is configured to adsorb one or more compounds while the third primary capillary column has a temperature between 20 and 50 degrees Celsius; and
one or more valves configured to:
during an adsorption process during which the first primary capillary column, the second primary capillary column and the third primary capillary column are at an adsorption temperature between 20 and 50 degrees Celsius, facilitate the sample to flow through the first primary capillary column, the second primary capillary column, and the third primary capillary column in a first direction, the first direction being from the first primary capillary column to the third primary capillary column, and
during a desorption process, facilitate a desorption gas to flow through the first primary capillary column, the second primary capillary column, and the third primary capillary column in a second direction, the second direction being from the third primary capillary column to the first primary capillary column.

2. The first trap of claim 1, wherein:
the first, second, and third primary capillary columns are open-tubular capillary columns,
the first sorbent coating the interior surface of the first primary capillary column leaves a first open passageway through the first capillary column,
the second sorbent coating the interior surface of the second primary capillary column leaves a second open passageway through the second capillary column, and
the third sorbent coating the interior surface of the third primary capillary column leaves a third open passageway through the third capillary column.

3. The first trap of claim 1, further comprising a heater, wherein:
during the desorption process, the heater heats the first trap to a desorption temperature between 100 and 300 degrees Celsius.

4. The first trap of claim 3, wherein:
the heater is positioned a first distance from the first primary capillary column,
the heater is positioned a second distance less than the first distance from the second primary capillary column,
the heater is positioned a third distance less than the second distance from the third primary capillary column, at a respective time during the desorption process:
the first primary capillary column has a first temperature,
the second primary capillary column has a second temperature greater than the first temperature, and
the third primary capillary column has a third temperature greater than the second temperature.

5. The first trap of claim 1, further comprising:
a desorption port between the first primary capillary column and a chemical analysis device; and
an exit port coupled to an exit port end of the third primary capillary column, wherein the second primary capillary column is coupled to an end of the third primary capillary column that is opposite the exit port end of the third primary capillary column, wherein:
during the desorption process, the desorption gas enters the third primary capillary column through the third primary capillary column and flows through the first, second, and third primary capillary columns in the second direction,
the desorption process causes the sample to desorb from the first, second, and third primary capillary columns in the second direction,
during the desorption process, the one or more valves allow the desorbed sample and the desorption gas to flow from the first primary capillary column to the chemical analysis device through the desorption port, and
the chemical analysis device performs the chemical analysis on the desorbed sample.

6. The first trap of claim 1, further comprising:
an exit port coupled to an exit port end of the third primary capillary column, wherein the second primary capillary column is coupled to an end of the third primary capillary column that is opposite the exit port end of the third primary capillary column, wherein:
during the adsorption process, the one or more valves facilitate the flow of water vapor included in the sample through the first, second, and third primary capillary columns through the exit port, thereby removing the water vapor included in the sample from the first trap, and
during the adsorption process, the first primary capillary column, the second primary capillary column, and the third primary capillary column are at the adsorption temperature between 20 and 50 degrees Celsius.

7. The first trap of claim 1, further comprising a first desorption port between the first primary capillary column and a second trap wherein:
the desorption process causes the sample to desorb from the first, second, and third primary capillary columns,
during the desorption process, the one or more valves allow the desorbed sample to flow from the first primary capillary column to the second trap through the first desorption port, and
the second trap comprises a first secondary capillary column and a second secondary capillary column connected in series with increasing affinity, wherein:
the first secondary capillary column has an interior surface coated by a fourth sorbent, wherein the first secondary capillary column having the interior surface coated by the fourth sorbent is configured to adsorb one or more compounds while the first secondary capillary column has a temperature between 20 and 50 degrees Celsius, the first secondary capillary column having a first end switchably couplable to the first desorption port,
the second secondary capillary column has an interior surface coated by a fifth sorbent, wherein the second secondary capillary column having the interior surface coated by the fifth sorbent is configured to adsorb one or more compounds while the second secondary capillary column has a temperature between 20 and 50 degrees Celsius, the second secondary capillary column having a first end coupled to the first secondary capillary column, and
the second trap further comprises one or more second valves configured to:
during a second adsorption process, allow the desorbed sample from the first trap to flow through the first secondary capillary column and the second secondary capillary column in a third direction, the third direction being from the first end of the first secondary capillary column to an opposite end of the second secondary capillary column that is opposite from the first end of the second secondary capillary column, and
during a second desorption process, allow a second desorption gas to flow through the first secondary capillary column and second secondary capillary column in a fourth direction, the fourth direction being from the opposite end of the second secondary capillary column to the first end of the first secondary capillary column.

8. The first trap of claim 7, wherein the second trap includes a same number of capillary columns as the first trap or fewer capillary columns than the first trap.

9. The first trap of claim 7, wherein the first secondary capillary column of the second trap is shorter than the first, second, and third primary capillary columns of the first trap, and the second secondary capillary column of the second trap is shorter than the first, second, and third primary capillary columns of the first trap.

10. The first trap of claim 7, wherein:
the second trap further comprises a second desorption port switchably couplable to the first end of the first secondary capillary column,
the second desorption process causes the sample to desorb from the first secondary capillary column and the second secondary capillary column,
during the second desorption process, the one or more second valves allow the desorbed sample from the second secondary capillary column to flow from the second secondary capillary column to the first secondary capillary column and allow the desorbed sample from the first secondary capillary column to flow from the first secondary capillary column to the chemical analysis device through the second desorption port, and
the chemical analysis device performs the chemical analysis on the desorbed sample from the first secondary capillary column and the second secondary capillary column.

11. A method of pre-concentrating a sample before chemical analysis, the method comprising:
during an adsorption process of a first trap, the first trap comprising a first primary capillary column, a second primary capillary column, and a third primary capillary column connected in series with increasing affinity, during which the first primary capillary column of the first trap, the second primary capillary column of the first trap, and the third primary capillary column of the first trap are a at an adsorption temperature between 20 and 50 degrees Celsius:
  facilitating, via one or more valves, the sample to flow through the first primary capillary column of the first trap, the second primary capillary column of the first trap, and the third primary capillary column of the first trap in a first direction, the first direction being from the first primary capillary column to the third primary capillary column; and
during a desorption process:
  facilitating, via the plurality of valves, a desorption gas to flow through the first primary capillary column, the second primary capillary column, and the third primary capillary column in a second direction, the second direction being from the third primary capillary column to the first primary capillary column,
wherein:
  the first primary capillary column has an interior surface coated by a first sorbent, the first primary capillary column with the first sorbent having a first affinity for one or more compounds of the sample, the first primary capillary column having a length between 0.2 and 5 meters,
  the second primary capillary column has an interior surface coated by a second sorbent, the second sorbent having a higher affinity for the one or more compounds than an affinity the first sorbent has for the one or more compounds, the second primary capillary column with the second sorbent having a second affinity for the one or more compounds of the sample, the second affinity greater than the first affinity, the second primary capillary column having a length between 0.2 and 5 meters,
  the third primary capillary column has an interior surface coated by a third sorbent, the third sorbent having a higher affinity for the one or more compounds than the affinity the second sorbent has for the one or more compounds, the third primary capillary column with the third sorbent having a third affinity for the one or more compounds of the sample, the third affinity greater than the first affinity, the third primary capillary column having a length between 0.2 and 5 meters, and
  the first primary capillary column, the second primary capillary column, and the third primary capillary column are coupled in series.

12. The method of claim 11, further comprising:
during the desorption process, heating the first trap to a desorption temperature with a heater of the first trap, the desorption temperature between 100 and 300 degrees Celsius.

13. The method of claim 11, further comprising:
during the desorption process:
  causing the desorption gas to enter the third primary capillary column through an exit port of the first trap, the exit port coupled to an exit port end of the third primary capillary column, wherein the second primary capillary column is coupled to an end of the third primary capillary column that is opposite the exit port end of the third primary capillary column,
  causing the sample to desorb from the first, second, and third primary capillary columns in the second direction; and
  allowing, via the one or more valves, the desorbed sample and the desorption gas to flow from the first primary capillary column to a chemical analysis device through a desorption port between the first primary capillary column and the chemical analysis device; and
performing the chemical analysis on the desorbed sample with the chemical analysis device.

14. The method of claim 11, further comprising:
during the adsorption process, facilitating, via the one or more valves, water vapor included in the sample to flow through the first, second, and third primary capillary columns through an exit port of the first trap, thereby removing the water vapor included in the sample from the first trap
wherein:
during the adsorption process, the first primary capillary column, the second primary capillary column, and the third primary capillary column are at the adsorption temperature between 20 and 50 degrees Celsius,
  the exit port of the first trap is coupled to an exit port end of the third primary capillary column, and
  the second primary capillary column is coupled to an end of the third primary capillary column that is opposite the exit port end of the third primary capillary column.

15. The method of claim 13, wherein the desorption process causes the sample to desorb from the first, second, and third primary capillary columns, and during the desorption process, the one or more valves allow the desorbed sample to flow from the first primary capillary column to a second trap through a first desorption port of the first trap, the method further comprising:
  during a second adsorption process, allowing, via one or more second valves of the second trap, the desorbed sample to flow through a secondary capillary column of the second trap in a third direction, the third direction being from a first end of the secondary capillary column to an opposite end of the secondary capillary column, and
  during a second desorption process, allowing, via the one or more second valves, a second desorption gas to flow through the secondary capillary column in a fourth direction, the fourth direction being from the opposite end of secondary capillary column to the first end of the secondary capillary column.

16. The method of claim 15, further comprising:
during the second desorption process:
  desorbing the sample from the secondary capillary column; and
  allowing, via the one or more second valves, the desorbed sample from the secondary capillary column to flow from the secondary capillary column into a chemical analysis device through a second desorption port of the second trap; and
performing, with the chemical analysis device, the chemical analysis on the desorbed sample from the secondary capillary column.

17. A system comprising:
a sample container containing a sample;
a first trap, the first trap comprising a first primary capillary column, a second primary capillary column, and a third primary capillary column connected in series with increasing affinity, wherein:
  the first primary capillary column has an interior surface coated by a first sorbent, the first primary capillary column having a length between 0.2 and 5 meters, the first primary capillary column with the first sorbent having a first affinity for one or more compounds of the sample, wherein the first primary capillary column having the interior surface coated by the first sorbent is configured to adsorb one or more compounds while the first primary capillary column has a temperature between 20 and 50 degrees Celsius;

the second primary capillary column has an interior surface coated by a second sorbent, the second sorbent having a higher affinity for the one or more compounds than an affinity the first sorbent has for the one or more compounds, the second primary capillary column having a length between 0.2 and 5 meters, the second primary capillary column with the second sorbent having a second affinity for the one or more compounds of the sample, the second affinity greater than the first affinity, wherein the second primary capillary column having the interior surface coated by the second sorbent is configured to adsorb one or more compounds while the second primary capillary column has a temperature between 20 and 50 degrees Celsius;

the third primary capillary column has an interior surface coated by a third sorbent, the third sorbent having a higher affinity for the one or more compounds than the affinity the second sorbent has for the one or more compounds, the third primary capillary column having a length between 0.2 and 5 meters, the third primary capillary column with the third sorbent having a third affinity for the one or more compounds of the sample, the third affinity greater than the second affinity, wherein the second primary capillary column is coupled between the first primary capillary column and the third primary capillary column in series, wherein the third primary capillary column having the interior surface coated by the third sorbent is configured to adsorb one or more compounds while the third primary capillary column has a temperature between 20 and 50 degrees Celsius;

a chemical analysis device, the chemical analysis device comprising a detector configured to detect one or more compounds of the sample; and one or more valves fluidly coupling the first trap to the sample container, the one or more valves configured to:

during an adsorption process during which the first primary capillary column, the second primary capillary column, and the third primary capillary column are at an adsorption temperature between 20 and 50 degrees Celsius, facilitate the sample to flow from the sample container through the first primary capillary column, the second primary capillary column, and the third primary capillary column in a first direction, the first direction being from the first primary capillary column to the third primary capillary column, and during a desorption process, facilitate a desorption gas to flow through the first primary capillary column, the second primary capillary column, and the third primary capillary column in a second direction, the second direction being from the third primary capillary column to the first primary capillary column and towards the chemical analysis device.

18. The system of claim 17, wherein the first trap further comprises a desorption port between the first primary capillary column and the chemical analysis device, wherein:

the desorption process causes the sample to desorb from the first, second, and third primary capillary columns, during the desorption process, the one or more valves allow the desorbed sample to flow from the first primary capillary column to the chemical analysis device through the desorption port, and the chemical analysis device performs the chemical analysis on the desorbed sample.

19. The system of claim 17, further comprising:

a second trap fluidly coupled to a desorption port of the first trap and to the chemical analysis device by way of the one or more valves, the second trap comprising a first secondary capillary column and a second secondary capillary column connected in series with increasing affinity, wherein:

the first secondary capillary column has an interior surface coated by a fourth sorbent, wherein the first secondary capillary column having the interior surface coated by the fourth sorbent is configured to adsorb one or more compounds while the first secondary capillary column has a temperature between 20 and 50 degrees Celsius; and the second secondary capillary column has an interior surface coated by a fifth sorbent, wherein the second secondary capillary column having the interior surface coated by the fifth sorbent is configured to adsorb one or more compounds while the second secondary capillary column has a temperature between 20 and 50 degrees Celsius, the second secondary capillary column having a first end coupled to the first secondary capillary column, wherein:

the desorption process is a first desorption process, and the one or more valves are further configured to:

during the first desorption process, allow the sample to desorb from the first, second, and third primary capillary columns and flow from the first primary capillary column to the second trap through the desorption port of the first trap;

during a second adsorption process, allow the desorbed sample from the first trap to flow through the first secondary capillary column and the second secondary capillary column in a third direction, the third direction being from a first end of the first secondary capillary column to an opposite end of the second secondary capillary column that is opposite from the first end of the second secondary capillary column; and during a second desorption process, allow a second desorption gas to flow through the first secondary capillary column and the second secondary capillary column in a fourth direction, the fourth direction being from the opposite end of the second secondary capillary column to the first end of the first secondary capillary column and into the chemical analysis device through a second desorption port of the second trap.

20. The first trap of claim 1, wherein:

the first primary capillary column has a first inner diameter less than 0.021 inches, the second primary capillary column has a second inner diameter less than 0.021 inches, and the third primary capillary column has a third inner diameter less than 0.021 inches.

21. The first trap of claim 7, wherein:
the sample has a first volume when exiting the first trap, and
the sample has a second volume less than the first volume when exiting the second trap.

\* \* \* \* \*

UNITED STATES PATENT AND TRADEMARK OFFICE
CERTIFICATE OF CORRECTION

PATENT NO. : 11,067,548 B2  
APPLICATION NO. : 15/479122  
DATED : July 20, 2021  
INVENTOR(S) : Daniel B. Cardin It is certified that error appears in the above-identified patent and that said Letters Patent is hereby corrected as shown below:

In the Claims

In Column 21, Line 2, in Claim 11, delete "a at" and insert --at--.

In Column 22, Line 12, in Claim 14, after "trap" insert --,--.

In Column 22, Line 24, in Claim 15, delete "claim 13," and insert --claim 11,--.

Signed and Sealed this  
Twenty-first Day of September, 2021

Drew Hirshfeld  
*Performing the Functions and Duties of the*  
*Under Secretary of Commerce for Intellectual Property and*  
*Director of the United States Patent and Trademark Office*